(12) United States Patent
Walker

(10) Patent No.: US 6,677,525 B1
(45) Date of Patent: Jan. 13, 2004

(54) SOCKET SHIELD

(76) Inventor: Frank D. Walker, 2005 S. 18th St., Philadelphia, PA (US) 19145

( * ) Notice: Subject to any disclaimer, the term of this patent is extended or adjusted under 35 U.S.C. 154(b) by 0 days.

(21) Appl. No.: 10/329,359

(22) Filed: Dec. 27, 2002

(51) Int. Cl.[7] .................................................. H02G 3/14
(52) U.S. Cl. ............................ 174/66; 174/67; 220/241; 220/242
(58) Field of Search ..................... 174/66, 67; 220/241, 220/242; D13/177

(56) References Cited

U.S. PATENT DOCUMENTS

| | | |
|---|---|---|
| 3,491,327 A | 1/1970 | Tait et al. |
| 4,381,063 A | 4/1983 | Leong |
| 4,424,407 A | 1/1984 | Barbic |
| 4,803,307 A | 2/1989 | Shotey |
| 4,851,612 A | 7/1989 | Peckham |
| 4,915,638 A | 4/1990 | Domian |
| 4,968,856 A | 11/1990 | Bowley et al. |
| 4,979,634 A | 12/1990 | Begley |
| 5,895,888 A * | 4/1999 | Arenas et al. ................. 174/66 |
| 6,066,805 A * | 5/2000 | Bordwell et al. ............. 174/66 |
| 6,218,616 B1 * | 4/2001 | Bates et al. ................... 174/66 |
| 6,281,440 B1 * | 8/2001 | Baldwin et al. .............. 174/66 |
| 6,512,178 B2 * | 1/2003 | Goodman ..................... 174/66 |
| 6,519,208 B2 * | 2/2003 | DeVries ........................ 368/10 |

* cited by examiner

Primary Examiner—Dhiru R Patel
(74) Attorney, Agent, or Firm—Richard C. Litman

(57) ABSTRACT

A socket shield for protecting an electrical receptacle includes a removable cover pivotally attached along an edge to a support bracket that is attached to a support surface, such as a wall near an electrical socket. The cover provides child resistance by including dual separable fasteners at each of the ends of a pair of legs for attaching the cover to a surface near the socket. The dual fasteners are easily separated by an adult, but resist separation by a child. The top surface of the cover includes a groove to direct accidentally spilled liquids away from the electrical sockets or outlets.

9 Claims, 4 Drawing Sheets

SOCKET SHIELD

BACKGROUND OF THE INVENTION

1. Field of the Invention

The present invention relates to protective coverings for electrical outlets or receptacles. In particular, the socket shield is a removable cover mounted over the outlet to prevent inadvertent removal of the plug and to prevent liquids from reaching the outlet.

2. Description of the Related Art

Various devices for covering the plug sockets or outlets of an electrical receptacle are known. However, in many cases, the covers can be easily removed by children, thus posing a hazard to the child's health and safety. Also, there are covers which are mounted by fasteners, e.g., by screws, but these are difficult to remove by children and adults alike. There is a need for a socket shield for covering and protecting an electrical outlet or receptacle that is resistant to removal by children, but that can easily be removed by an adult, thereby providing access to the sockets.

U.S. Pat. No. 3,491,327, issued to Tait et al. on Jan. 20, 1970, teaches a safety cover for electrical outlets in which the cover is has a fixed portion mounted on the wall and a removable portion. U.S. Pat. No. 4,381,063, issued to Leong on Apr. 26, 1983, teaches a weatherproof outlet cover having a hinged face. U.S. Pat. No. 4,424,407, issued to Barbic on Jan. 3, 1984, teaches an electrical outlet cover which is attached to its mount using a screw.

U.S. Pat. No. 4,803,307, issued to Shotey on Feb. 7, 1988, teaches a weatherproof outlet cover having a removable lid. U.S. Pat. No. 4,851,612. issued to Peckham on Jul. 25, 1989, teaches an outlet protector having a removable lid that is snapped in place. U.S. Pat. No. 4,915,638, issued to Domian on Apr. 10, 1990, teaches an outlet cover with a swinging lid.

U.S. Pat. No. 4,968,856, issued to Bowley et al. on Nov. 6, 1990, teaches a socket cover having a slidable shutter. U.S. Pat. No. 4,979,634, issued to Begley on Dec. 25, 1990, teaches a protective cover having a pivoting face.

There is a need for a protective cover for electrical outlets in which the removable portion is easily attached and detached by an adult, but is difficult to remove by a child. The socket shield of the present invention fulfills this need by providing a covert having two different separable fasteners, wherein both fasteners must be separated in order to remove the cover. The two fasteners are a hook-and-loop fastener and a pin-and-socket snap.

None of the above inventions and patents, taken either singly or in combination, is seen to describe the instant invention as claimed. Thus a socket shield solving the aforementioned problems is desired.

SUMMARY OF THE INVENTION

The socket shield includes a detachable cover that is held onto a mounting surface, e.g., a wall, by a support bracket and by two legs, each leg having a separable dual fastener at its end. The cover includes an elongated edge which slides into a corresponding elongated channel in the bracket to provide a hinge-like or pivoting action between the cover and the bracket.

The dual fastener is a hook and loop fastener and a snap fastener, the snap fastener preferably made of metal. The presence of the dual fastener renders the cover resistant to removal by children, yet is easy to remove by an adult. Also, the cover includes a groove that directs any accidentally spilled liquids to the sides of the cover, away from the sockets.

Accordingly, it is a principal object of the invention to provide a socket shield in which a removable cover is fastened to a mounting surface above an electrical receptacle by separable dual fasteners.

It is another object of the invention to provide a socket shield having a cover which is attached to a mounting surface by dual fasteners which include a hook and loop fastener and a snap fastener.

It is a further object of the invention to provide a socket shield a cover for an electrical receptacle is attached to a mounting surface by a snap fastener made of metal.

Still another object of the invention is to provide a socket shield as above in which the cover has an elongated edge that is slidably inserted into a corresponding elongated channel in a support bracket and which permits the cover to pivot with respect to the support bracket.

Still another object of the invention is to provide a socket shield for an electrical receptacle which includes a groove on its top surface to direct spilled liquids to the sides of the cover away from the sockets.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a socket shield for protection of the sockets or outlets of an electrical receptacle. In particular, the socket shield includes dual separable fasteners, both of which must be removed in order to remove the cover from its mounting. The two fasteners are a hook and loop fastener and a snap fastener preferably made of metal. The two different fasteners are intended to be easily separated by adults but difficult to be separated by children.

Figure 1:
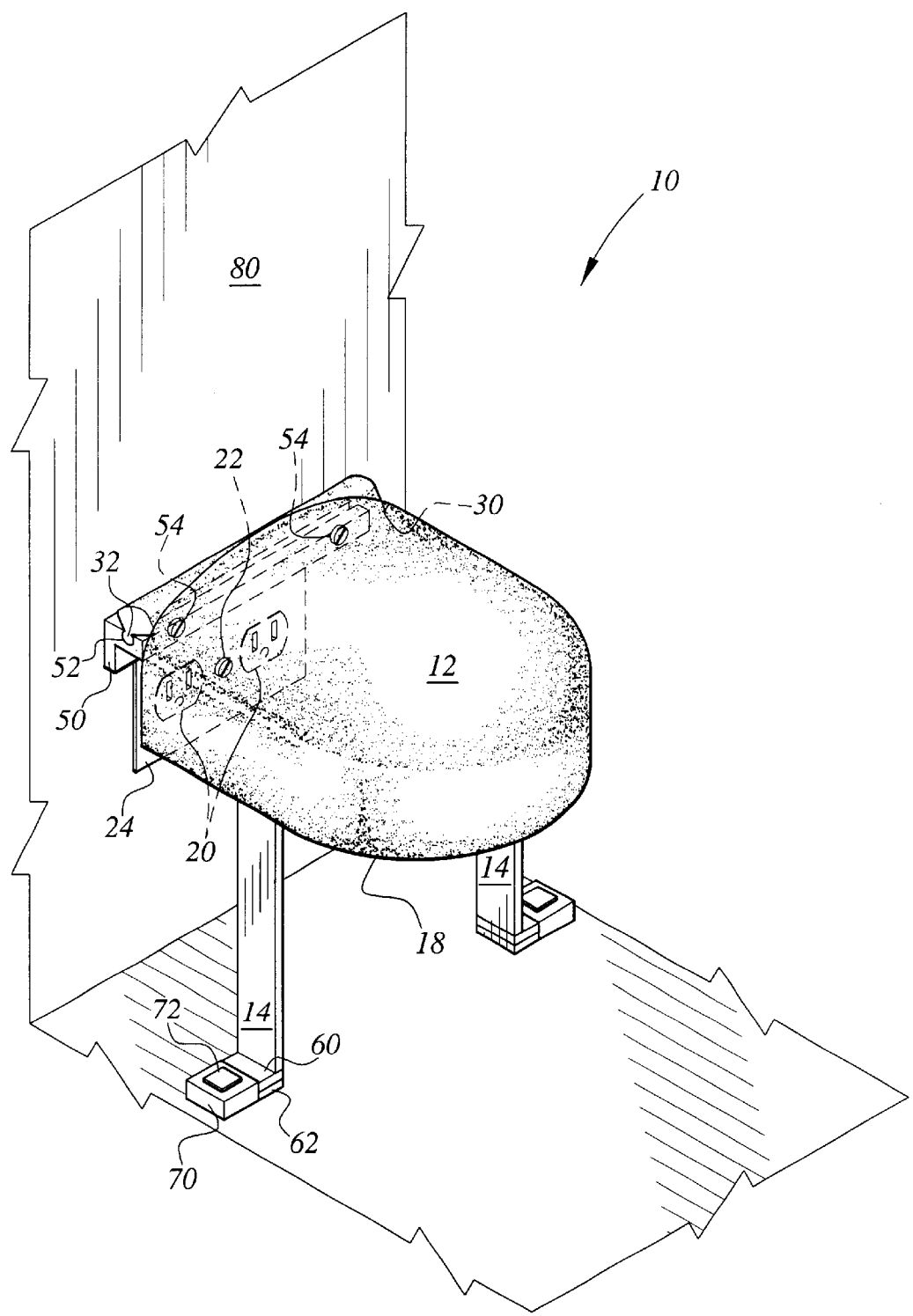
FIG. 1 is a perspective view of a socket shield according to the present invention.
Figure 2:
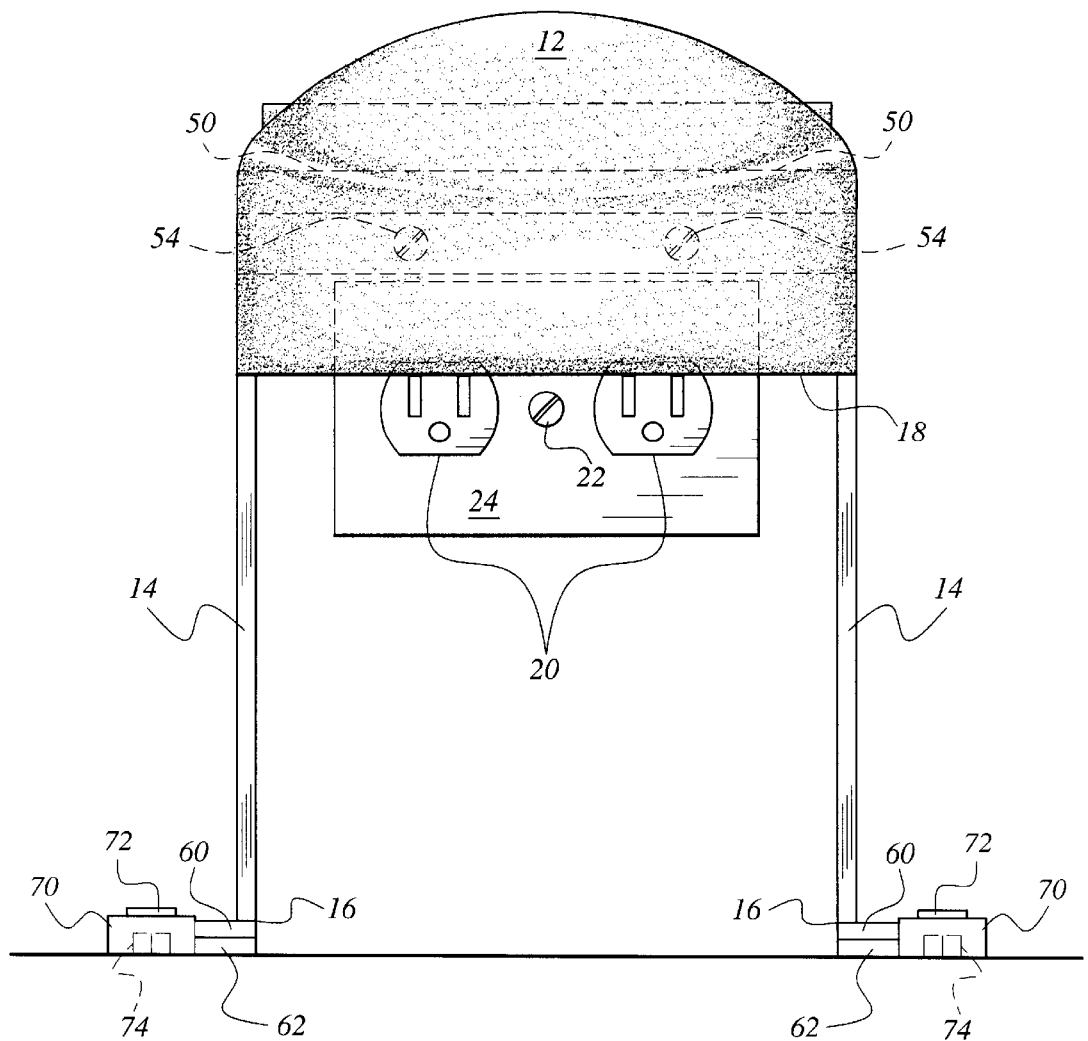
FIG. 2 is an environmental front view of the socket shield according to the present invention.

FIG. 1 is a perspective view of the socket shield 10 mounted to the wall and the floor. FIG. 2 is a front view of the shield 10 of FIG. 1. As shown, a receptacle having a pair of electrical sockets or outlets 20 is mounted to the wall 80 and has a cover 24 that is held in place over the outlet box by a screw 22 in a known manner. Socket shield 10 includes a removable cover 12 attached to support bracket 50. The bracket 50 is fastened to the wall 80 in any known manner, in this case using two screws 54.

The cover 12 includes an elongated, arch-shaped top portion with a skirt depending from the front and side edges of the top portion so that the cover 12 defines an elongated canopy. The rear of the cover 12 has a rearward extending flange or hinge portion, seen in FIG. 3, which extends along the width of the cover and terminates in an elongated cylinder or rod 32 which forms a hinge with the support bracket 50, as described below.

The cover 12 includes legs 14 that extend below skirt 18 to the dual fasteners at the ends of each of the legs 14. The dual fasteners include a two piece hook and loop fastener, 60 and 62, and a two-piece snap fastener, 70 and 72, e.g., a stud-and-socket fastener. One piece 62 of the hook and loop fastening material is permanently affixed to the floor, while the other piece 60 is permanently attached to the end 16 of leg 14, e.g., by adhesive. Also, the male component 72 of the snap fastener is permanently attached to the floor, e.g., by screws 74, while the female component 70 is permanently attached to the free end of the hook and loop fastener 60.

The female component 70 of the snap fastener is released by pressing the top of the male component 72, e.g., the exposed stud. In order to release the dual fastener to remove the socket cover 12 from its bracket, the snap fastener is first released by pressing male component 72 and the female component 70 is then lifted to lift the detach hook and loop fastener 60 from hook and loop fastener 62. This procedure can be performed easily by an adult, but only with great difficulty by a child.

Figure 3:
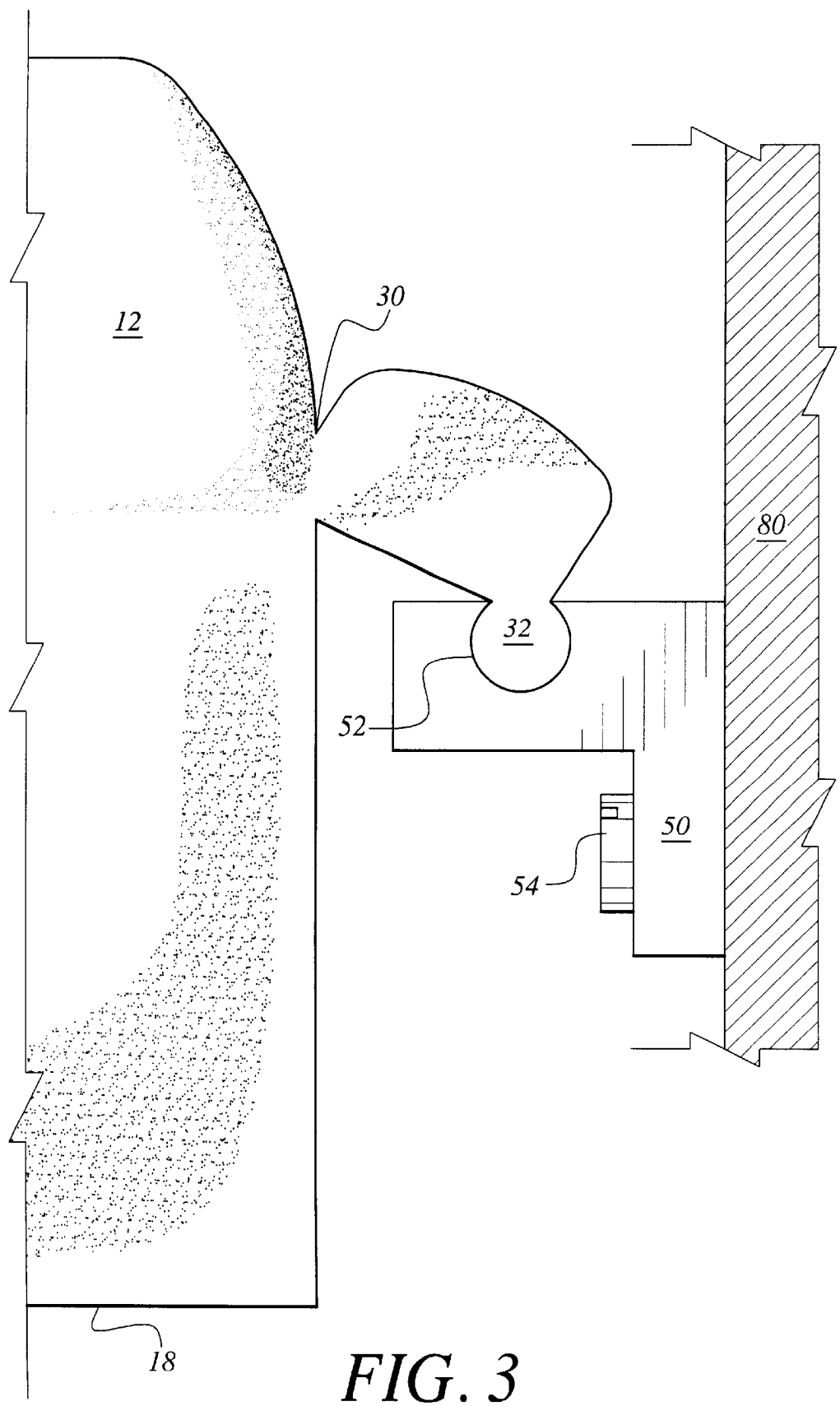
FIG. 3 is an environmental side view of the hinge portion of the socket shield according to the present invention.

FIG. 3 shows a detailed side view of the mounting bracket 50. The bracket 50 includes a channel 52 having a generally circular cross-sectional shape. The cover 12 includes a generally rod-shaped edge 32 that fits in the channel 52, allowing the shield 10 to pivot along its edge with respect to the bracket 50.

In addition to the child-resistant feature, the shield 10 also protects the sockets or outlets 20 from spilled liquids by directing the liquid along a groove 30 formed between the cover 12 and the rearward extending flange and which extends toward the sides of the shield 10, away from the sockets 20. Moreover, the length of the skirt 18 can be made to extend sufficiently close to the floor and the shield 10 can be made sufficient in size to prevent a child's hands or fingers from reaching the sockets 20 while allowing the electrical cords to extend outward from beneath the skirt 18.

Figure 4:
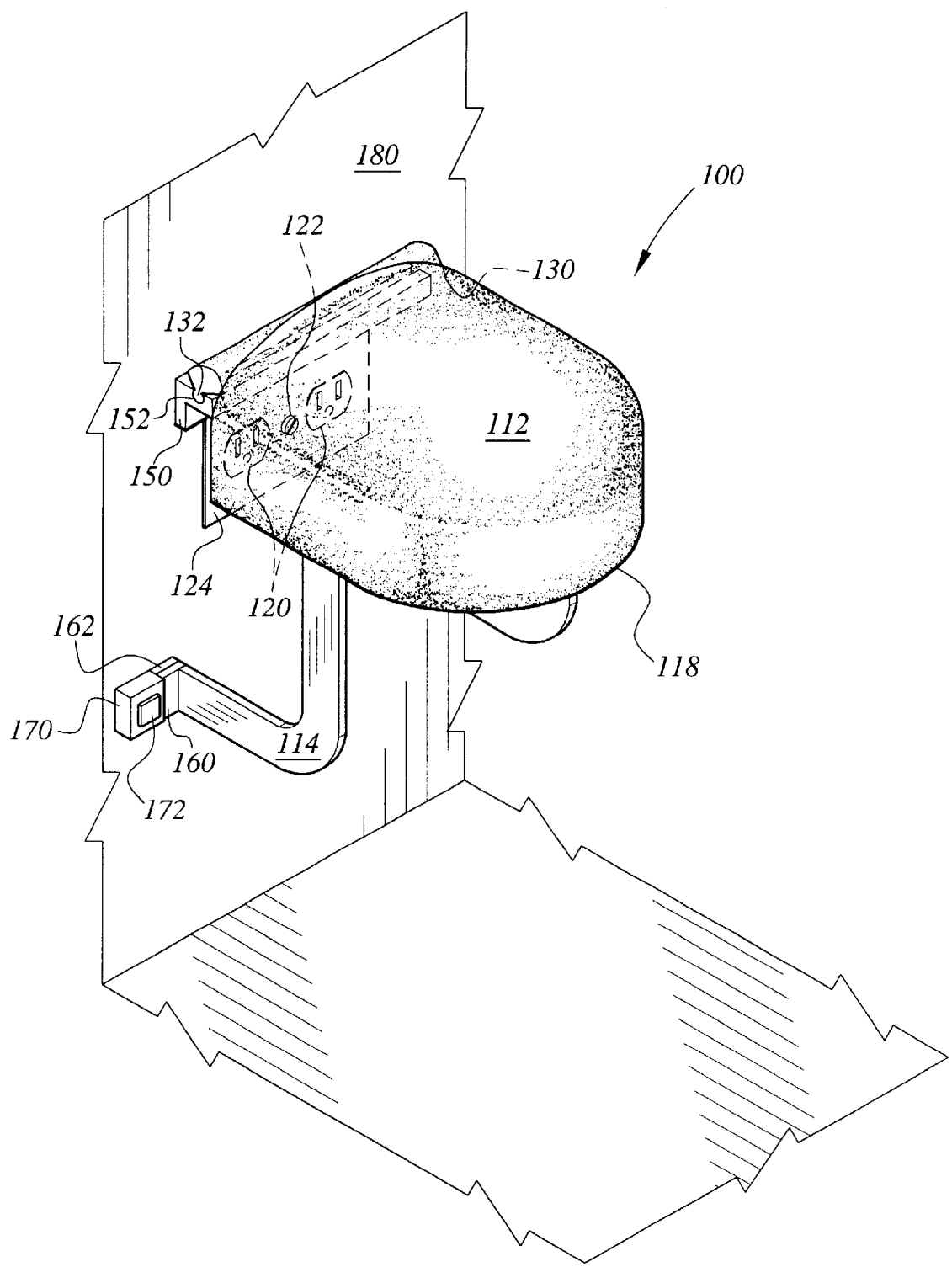
FIG. 4 is an environmental perspective view of a socket shield according to the present invention configured for attachment solely to a wall.

A version of the socket shield 100 for mounting onto a wall 180 is shown in FIG. 4. This version is useful in situations where the sockets 120 are mounted high on the wall 180 so that it becomes impractical to have legs [14] 114 which extend all the way to the floor. Although this version lacks the child protection of the floor-mounted version, it nonetheless provides protection of the electrical sockets 120 against spilled liquids by including the groove 130 between the hinge flange and cover 112 at the rear of the shield 112.

An edge 132 of the removable cover 112 is pivotally held in corresponding channel 152 of the support bracket 150. Receptacle cover plate 124 provides known protection for the sockets 120.

As in the wall-and-floor mounted version, the legs 114 of the shield are each provided with a dual separable fastener including hook and loop fastener, 160 and 162, and snap fastener 170 and 172. In this configuration the legs 114 have a 90° bend so that the feet are attached to the wall instead of the floor.

Although the snap fastener is depicted in the drawings as being square, the fastener can be round as well. Moreover, although the snap fastener is preferably made of metal, plastic fasteners can be used. The snap action can occur in any known manner, e.g., stud-and-socket.

The cover can be made of any suitable material, including plastic, rubber or wood.

It will be understood that, although the drawings show the receptacle with two outlets 20 aligned horizontally, the cover 12 of the shield 10 may be configured for receptacles having the outlets 20 aligned vertically.

It is to be understood that the present invention is not limited to the embodiments described above, but encompasses any and all embodiments within the scope of the following claims.

I claim:

1. A socket shield for protecting sockets in an electrical receptacle from spilled liquids, comprising:
    a removable cover having an elongated, arch-shaped top portion, a front, a rear, and two opposing sides, the shield further having a skirt depending from the front and two opposing sides, the cover defining an elongated canopy;
    a bracket adapted for attachment to a first support surface above the receptacle, the rear of the cover being removably attached to the bracket so that the cover extends above the sockets; and
    two legs extending downward from the two opposing sides of the skirt, each of said legs having a separable dual fastener at its end adapted for fastening the legs to a second support surface;
    wherein the separable dual fasteners are resistant to separation by a child and are easily separated by an adult.

2. The socket shield of claim 1, wherein:
    said bracket has an elongated channel defined therein; and
    said cover further comprises an elongated flange extending rearward from said cover, the flange terminating in an elongated, cylindrical rod, the rod being slidably inserted in the channel defined in said bracket in order to form a hinge between said cover and said bracket.

3. The socket shield according to claim 2, wherein said flange has an elongated groove defined therein between said flange and said cover and between the opposing sides of said cover, whereby a liquid spilled on the socket shield is diverted to the opposing sides of said cover.

4. The socket shield of claim 1, wherein each said dual fastener comprises a hook and loop fastener and a snap fastener.

5. The socket shield according to claim 4, wherein said hook and loop fastener comprises:
    a first patch of hook and loop fastening material extending from each of said legs; and a second, mating patch of hook and loop material adapted for attachment to the second supporting surface.

6. The socket shield according to claim 5, wherein said hook and loop fastener comprises:

a male component adapted for attachment to the second supporting surface; and a female component attached to said first patch of hook and loop fastening material, the female component releasably engaging the male component simultaneously with said first patch of hook and loop fastening material mating with said second patch in order to fasten said leg to the second supporting surface.

7. The socket shield of claim 4, wherein said snap fastener is made of a material selected from the group consisting of plastic and metal.

8. The socket shield of claim 1, wherein each said leg is linear, whereby the rear of said cover is adapted for attachment to a vertical support surface and said legs are adapted for attachment to a horizontal support surface.

9. The socket shield of claim 1, wherein each said leg is bent at a 90° angle, whereby both the rear of said cover and said legs are adapted for attachment to a vertical support surface.

* * * * *